March 14, 1939. R. WILLIAMS 2,150,856

THRESHING MACHINE

Filed May 27, 1936

INVENTOR
Richard Williams

ATTORNEY

Patented Mar. 14, 1939

2,150,856

UNITED STATES PATENT OFFICE 2,150,856

THRESHING MACHINE

Richard Williams, Watford, Ontario, Canada

Application May 27, 1936, Serial No. 82,091
In Canada June 20, 1935

1 Claim. (Cl. 130—23)

This invention relates to improvements in a threshing machine and appertains particularly to a cleaning device associated with the main cylinder.

An object of this invention is to provide a threshing machine with means to relieve the main cylinder as quickly as possible of the burden of straw it has passed.

A further object of the invention is to provide a threshing machine with a revolving cleaner positioned under and working through the grated delivery end of the concave for quickly drawing off the straw that has passed the main cylinder.

A further object of the invention is to provide a threshing machine with an additional cylinder between the main cylinder and the drum cylinder, positioned below the two usual cylinders and rotating in the opposite direction to aid in loosening, spreading and equalizing the movement of the straw.

A still further object of the invention is the provision of a threshing machine improvement of the nature and for the purposes described that will reduce the power required to operate the machine and lessen the loss of grain, that is characterized by structural simplicity, durability and efficiency and being capable of production and use at reasonable cost if thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claim hereunto appended.

The invention will be best understood and can be more clearly described when reference is had to the drawing forming a part of this disclosure wherein like characters indicate like parts throughout the several views.

Figure 1:
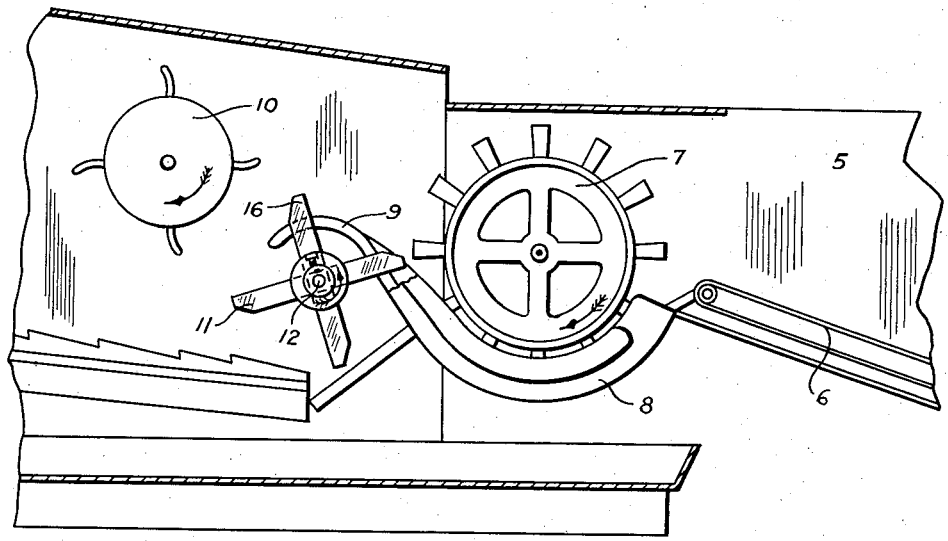
Figure 1 is a sectional side elevation of a portion of a thresher embodying my invention.
Figure 2:
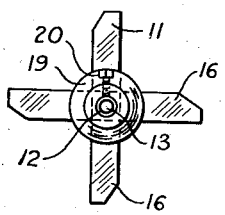
Figure 2 is an end elevation of the new cleaning cylinder alone.
Figure 3:
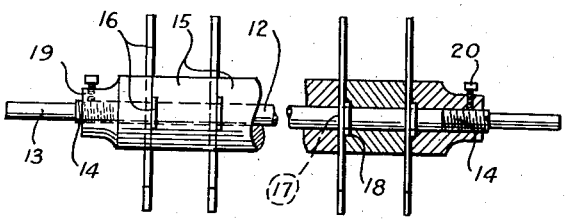
Figure 3 is a side elevation thereof, with part shown in section.

In threshing machines of this kind the main cylinder has been found to choke at times resulting in the slowing up of the machine and the passage of some inadequately threshed grain occasioning considerable loss. In this connection it is to be recognized that the power required to operate a machine of this description reaches its peak or maximum in the driving of an overloaded threshing cylinder, so to lower this peak and avoid this congestion entailing an expensive loss, the present improvement is designed and placed to carry the straw which it loosens and spreads away from the main threshing cylinder as quickly as possible to obviate any load of passed straw retarding or burdening this cylinder.

The machine in the illustrations herewith shows a thresher with a conventional feeding quadrant or inlet 5 that may be supplied in any desired manner as by the endless platform 6. This delivers to the main cylinder 7 that threshes the grain in association with the usual concave 8. The tail end of the concave is formed as a grate 9 and reaches well up the back of the main cylinder 7 and terminates in a reverse curve reaching toward the drum cylinder 10.

It is under this reversely curved grate 9 that the new load revolving cleaner 11 is disposed transversely. Described particularly it may be said to comprise a revolvable shaft 12 designed to be driven in a direction opposite to the main cylinder 7; its ends 13 are of reduced thickness for accommodation in suitable supporting bearings not shown. Next to these reduced ends 13, the shaft is threaded as at 14 and between these threaded portions 14 carries a plurality of spacers 15 of wood, metal or suitable composition. Between each of the spacers 15 a pair of beater arms 16, centrally perforated as at 17 to pass the shaft 12, is disposed with the arms at right angles to each other to provide a substantially regular cruciform as shown. To accommodate these crossing diametric arms, that project out each side of the spacer-formed cylinder a distance about equal to the spacer's own diameter, the spacers 15 are each provided with a diametric slot 18 in each end which to preserve uniformly in the assembly of the cleaner 11 are preferably at right angles to each other. The dimensions of such slots are obviously roughly similar to the cross section of the beater arms they accommodate. End jams 19 of approximately half the width of the spacers 15 are at least partially threaded to engage the screw ends 14 of the shaft by means of which the spacers and beater arms are tightly secured in place. The inner faces of the end jams 19 include one of the diametric slots 18 for cooperation with the adjacent face of the adjoining spacer in supporting the end cruciforms of beaters and to secure the same against accidental loosening a locking expedient such as the set screw 20, a lock nut or the like is employed.

In operation, as the straw comes under the main cylinder and tends to pile up or wrap around it causing the objectional overload that entails loss of power and grain, the arms 16 of this cleaner 11, working through the grated tail 9 of the concave, relieves the load and prevents the winding and in doing so loosens and spreads the straw as it clears it quickly to the drum cylinder 10.

From the foregoing description taken in connection with the accompanying drawing, it will be manifest that a threshing machine is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what is claimed as new is:

In combination with the reversely curved and grated delivery end of a threshing machine concave, a cleaner comprising a transverse rotatable shaft thereunder, spacers along said shaft, cruciforms to extend through the grating of said concave, each formed of a pair of crossed beater arms at right angles to each other between said spacers and centrally perforated to pass said shaft, said spacers having slots in their ends at right angles to each other to accommodate said crossed beater arms, and means on opposite ends of the shaft to confine the assembly of said spacers and beater arms on said shaft.

RICHARD WILLIAMS.